United States Patent
Kari et al.

(10) Patent No.: US 6,542,489 B1
(45) Date of Patent: *Apr. 1, 2003

(54) METHOD AND MEANS FOR TRANSMITTING A SERVICE PAGE IN A COMMUNICATION SYSTEM

(75) Inventors: Janne Kari, Helsinki (FI); Heikki Rautila, Espoo (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,419

(22) Filed: Apr. 1, 1998

(30) Foreign Application Priority Data

Apr. 4, 1997 (FI) ................................................. 971386

(51) Int. Cl.⁷ ................................................. H04Q 7/24
(52) U.S. Cl. ..................... 370/338; 370/352; 379/93.17; 379/309
(58) Field of Search ................................ 709/203, 217, 709/218, 219; 370/352, 354, 328, 338, 389; 379/88.17, 93.01, 93.05, 93.07, 93.17, 258, 265, 309

(56) References Cited

U.S. PATENT DOCUMENTS

| | | | |
|---|---|---|---|
| 5,555,299 A | | 9/1996 | Maloney et al. ............ 379/212 |
| 5,907,547 A | * | 5/1999 | Foladare et al. ............ 370/352 |
| 5,960,073 A | * | 9/1999 | Kikinis et al. ............ 379/265 |
| 5,991,394 A | * | 11/1999 | Dezonno et al. ............ 379/265 |
| 6,058,307 A | * | 5/2000 | Garner ........................ 455/428 |
| 6,067,546 A | * | 5/2000 | Lund ........................... 707/10 |

FOREIGN PATENT DOCUMENTS

| | | |
|---|---|---|
| EP | 0 377 394 A3 | 7/1990 |
| EP | 0 721 266 A2 | 7/1996 |
| EP | 0 753 956 A2 | 1/1997 |

OTHER PUBLICATIONS

GSM 02.81 of ETSI ETS 300 514 A1 European Digital Cellular Telecommunications System (Phase 2); Line Identification Supplementary Services—Stage 1.

* cited by examiner

Primary Examiner—Alpus H. Hsu
Assistant Examiner—Thien D Tran
(74) Attorney, Agent, or Firm—Perman & Green, LLP

(57) ABSTRACT

The transmission of a service page according to the present invention provides for versatile data to be displayed on a display of a terminal, which is in contact with a telecommunication network, on the basis of CLIP or CoLP identifier information. This is implemented, for example, so that after having received (31) the CLIP identifier information, characteristic of a subscriber A, a subscriber B contacts a server (32), through a telecommunication network, and transmits (33) to it the CLIP information on the subscriber A. On the basis of this, the server transmits to the subscriber B the address of a service page (37), characteristic of the subscriber A, provided that it is located in a database (34, 35). After this, the subscriber B retrieves (38), from an Internet address (37) it has received, the service page, characteristic of the subscriber A, and displays it on its display (39).

14 Claims, 7 Drawing Sheets

US 6,542,489 B1

METHOD AND MEANS FOR TRANSMITTING A SERVICE PAGE IN A COMMUNICATION SYSTEM

OBJECT OF THE INVENTION

Figure 1:
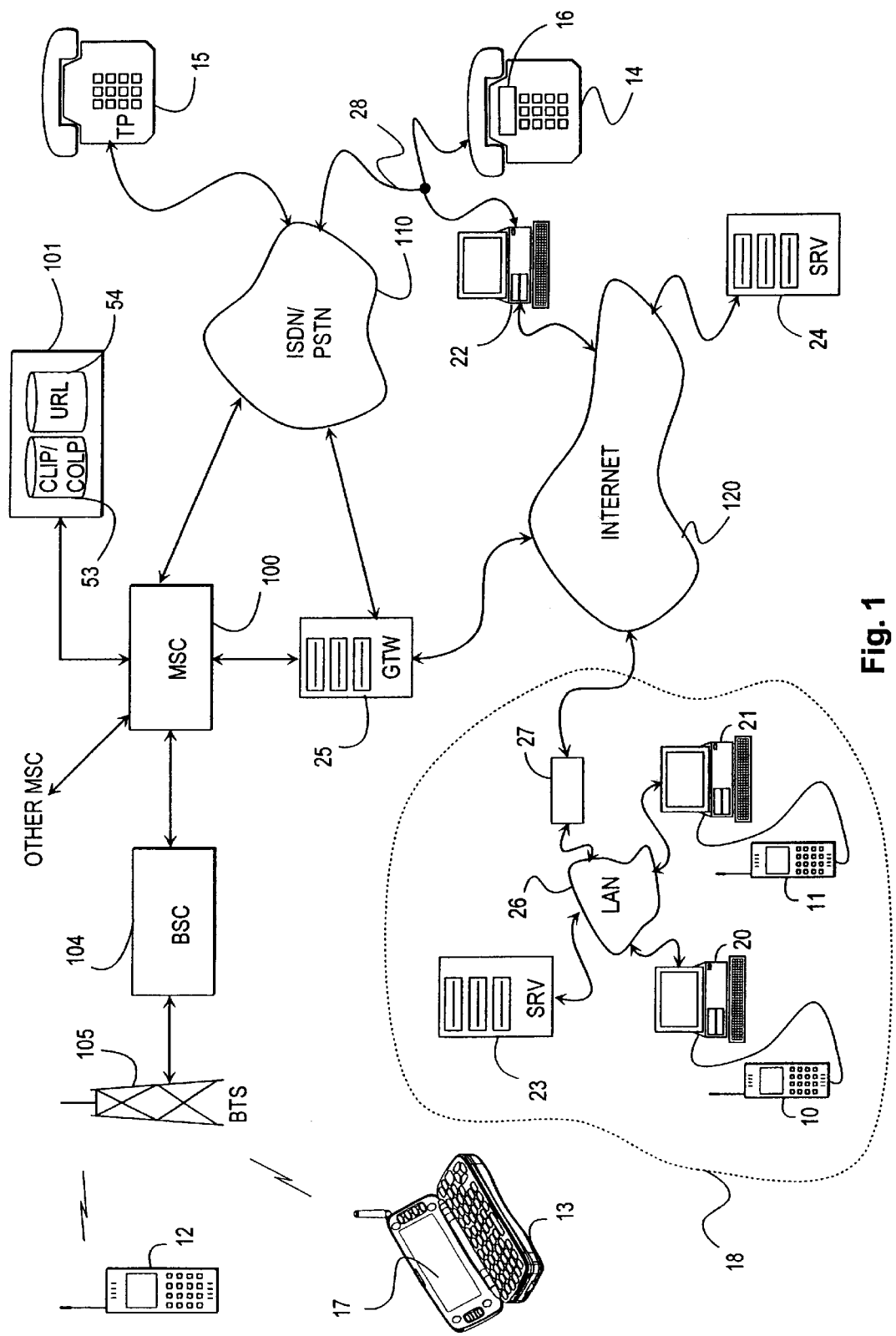

The present invention relates to a method and means for transmitting service pages implemented in a telecommunication network, such as in an Internet network, to a terminal. The invention is suitable for use particularly in connection with portable terminals, such as mobile stations.

BACKGROUND OF THE INVENTION

Digital telephone exchanges and terminals, such as telephones of a wired network and mobile stations, provide for a number of new services to be utilised. One of them is the commonly used identification service of a caller (subscriber A), i.e., the CLIP (Calling Line Identification Presentation) service. With the help of this service, the identifier of the subscriber A, substantially the telephone number of the subscriber A, is transmitted to a receiving terminal (subscriber B), wherein it is typically displayed on the display of the terminal of the subscriber B. On the basis of this information, the subscriber B can see from which number the call is coming. It is also very common that the most frequently used telephone numbers and the names and other identifiers of the corresponding persons have been stored in the terminal of the subscriber B. This function is used particularly in mobile telephones, wherein it is possible to display, on the display of the terminal of the subscriber B, the name or some other identifier of the subscriber A, e.g., the name of the subscriber A's company, on the basis of the telephone number of the subscriber A. Another new service provided by digital telephone networks is the so-called CoLP (Connected Line Identification Presentation) service. This service transmits to the caller (subscriber A) information on what is the actual identifier (telephone number) of the opposite end (subscriber B) of the connected line. With the help of this service, the subscriber A receives information on the subscriber B's actual telephone number of that moment even if the subscriber B has carried out a call transfer.

The supplementary services relating to the identification of a line, such as the CLIP and CoLP services presented above, defined in the GSM mobile telephone system, have been presented in the GSM Standard GSM 02.81 of the ETSI (European Telecommunications Standards Institute). It defines, amongst other things, in which form the CLIP and CoLP data are transmitted in the GSM system. Both the CLIP and CoLP services contain an extremely limited amount of information. It would be useful if, in addition to the CLIP and CoLP services, it would also be possible to transmit other information.

An increasing number of companies and corporations, in particular, but also private persons have taken into use services based on the Internet network. Due to advanced terminals and more efficient network connections, it is possible to transmit, in the Internet network, various kinds of data including speech and video pictures. Hypermedia pages that have been implemented in the HTML (Hypertext Markup Language) in a WWW (World Wide Web) environment have become particularly popular. On these hypermedia pages, it is possible to create interactive documents or purely informative service pages. Similarly, the pages can also be used for advertising or for providing the address or personal data of a company or a private person possibly together with maps and pictures.

The Internet network consists of a number of servers and telecommunication networks, which transmit messages in a digital form. The messages, such as, e.g., hypermedia pages, are transferred as files from one server to another and finally to a receiving terminal. The HTTP (HyperText Transfer Protocol) is commonly used for data transmission, the protocol transmitting the information intended for transfer in a form of a packet between the terminals on the basis of a URL (Uniform Resource Locater) address information characteristic of each terminal.

SHORT SUMMARY OF THE INVENTION

A method and means have now been invented by means of which it is possible to utilise service pages provided by a telecommunication network, e.g., the Internet network, by means of wired or wireless terminals coupled to the telecommunication network, on the basis of supplementary services, such as the CLIP and CoLP services presented above, relating to line identification. The service pages may contain, e.g., text, graphics or moving video pictures. In a communication system according to the present invention, it is possible to transmit service pages according to several principles. In a first embodiment, a caller (subscriber A) can link the address of the desired service page (in the Internet network, a URL identifier) with the subscriber's own identifier (in the GSM system, with the information transmitted by the CLIP service, i.e., one's own telephone number), on the basis of which a receiving terminal (subscriber B) can retrieve the selected service page from the telecommunication network and display it on the display of the receiving terminal. This method can be utilised, e.g., for advertising purposes, whereupon a teleseller transmits additional information to the customers called. In a second embodiment of the present invention, a receiving terminal (subscriber B) links, on the basis of the telephone number of a subscriber A, the service page he has selected with the number in question and retrieves the service page to his own display. This proceeding is suitable, e.g., for a seller (subscriber B) receiving calls for presenting customer data, whereupon he can, on the basis of the caller's CLIP information, retrieve from his own or the company's database the caller's (subscriber A) volume of orders in hand, prices or even credit information.

The chapter above presented different embodiments of the present invention, wherein the desired service page was retrieved from the subscriber A on to the display of the subscriber B on the basis of the CLIP service transmitted to the subscriber B. Similarly, the desired service page can be transmitted on the basis of a CoLP service. In a third embodiment of the present invention, a service page selected by the subscriber B, which can be used, e.g., for advertising purposes, is transmitted on to the display of the subscriber A. This embodiment is suitable, e.g., for situations, where a customer calls the telephone number of a company providing certain products or services and receives automatically to his terminal additional information on the products or services provided by the company in the form of a service page. However, the use of the CoLP service instead of the CLIP service gives one advantage. The subscriber A, at whom the advertisement is directed, can be certain of the advertisement's origin because, for example, call transfers implemented in a telephone network cannot affect the authenticity of the CoLP service. This method is also extremely suitable for key telephone systems, wherein it is possible to implement, e.g., in a hospital on duty, a service which automatically tells the subscriber A the contact information, rank and, for example, the special expertise of the person who has answered the key telephone. On the basis of this information, the customer knows to whom he is speaking and can ask the call to be transferred to another person if necessary.

In a fourth embodiment of the present invention, a service page that he himself has selected is transmitted to the subscriber A on the basis of the CoLP service. This enables, for example, the expansion of the teleselling application presented in the second embodiment of the present invention so that the customer's volume of orders in hand, prices or even credit information, stored in the company's database, are also automatically available when a seller acts as the subscriber A, i.e., calls the customers (subscribers B). This system is safe, because the reliability of the CoLP information guarantees that the seller can be certain with whom he is doing business. However, nothing prevents the seller application presented above from being further expanded so that said service page is transmitted to both the seller and the customer, whereupon they can refer to the same database during the discussion. In his case, however, safety factors (e.g., to prevent credit information and/or other information intended for the company's internal use from being transmitted) should be taken into consideration.

In the embodiments of the present invention presented above, a reference table, typical of the invention, is required, wherefrom a URL address of the desired service page is retrieved on the basis of the information transmitted by the CLIP or CoLP service. The reference table can be located in different servers of a telecommunication network (e.g., the Internet), in servers implemented in connection with a telephone exchange or a private branch exchange, in a company's own data network (e.g., intranet) or in a user's own computer. It is also possible to store the reference table, e.g., in the memory of a portable terminal, such as a communicator like the Nokia 9000 Communicator. In this case, the transmission of the service page speeds up, because it is not necessary to retrieve the URL address of the service page from the server implemented in connection with the telecommunication network or the telephone exchange, but the communicator can down load the desired service page directly from the URL address it has retrieved from its memory.

Thus, the transmission of a service page in a communication system according to the present invention enables, amongst other things, an Internet home page, characteristic of each individual or company, to be displayed on the display of the terminal of the subscriber B instead of the telephone number or the name of the subscriber A. Hence, the present invention provides versatile and flexible opportunities to increase the amount of information transmitted on the basis of the CLIP and CoLP services and lays a foundation for providing new types of information services. The invention is suitable for use in connection with both terminals coupled to a wired network and portable terminals, such as mobile stations.

The invention is characterised in what has been said in the characterising parts of Claims 1, 7 and 8.

PRESENTATION OF FIGURES USED IN THE SPECIFICATION

Figure 2:
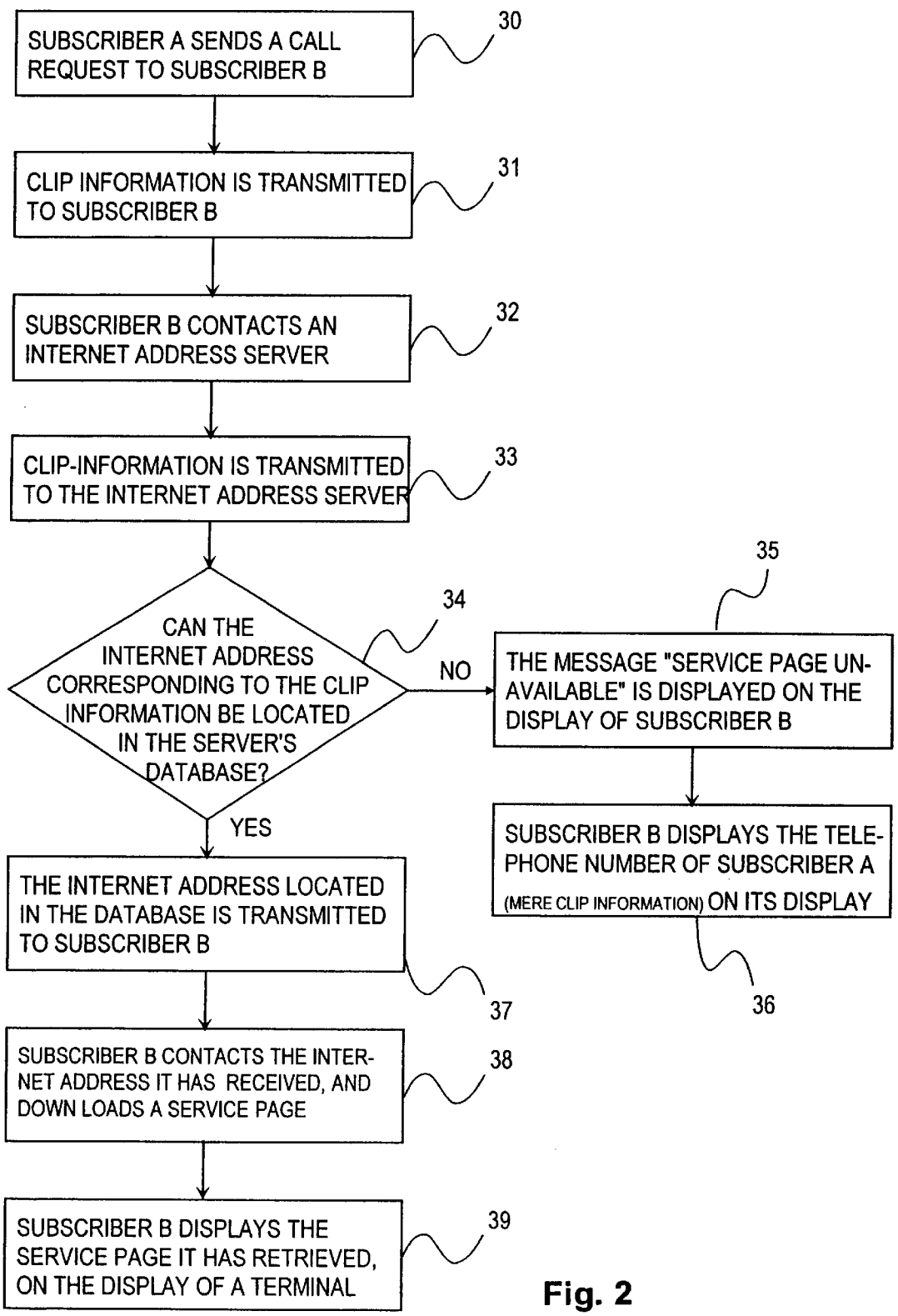
Figure 3:
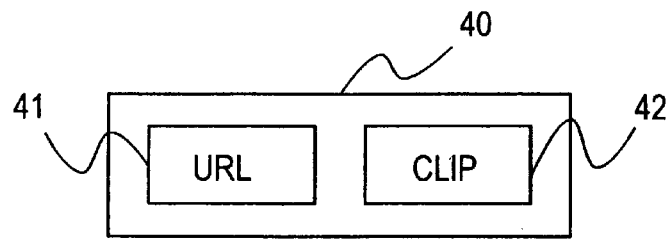
Figure 4:
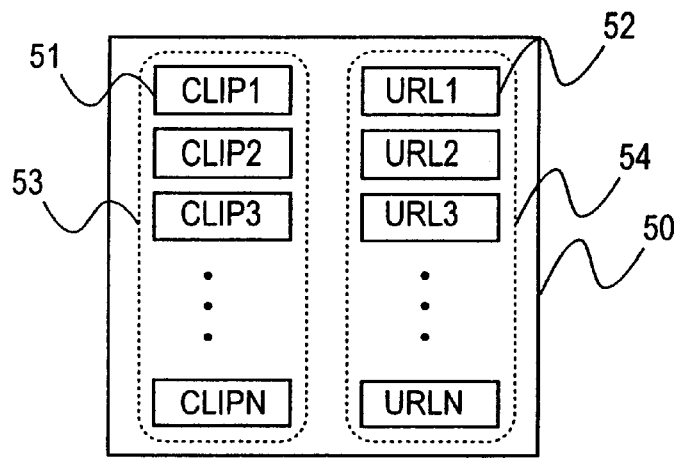
Figure 5:
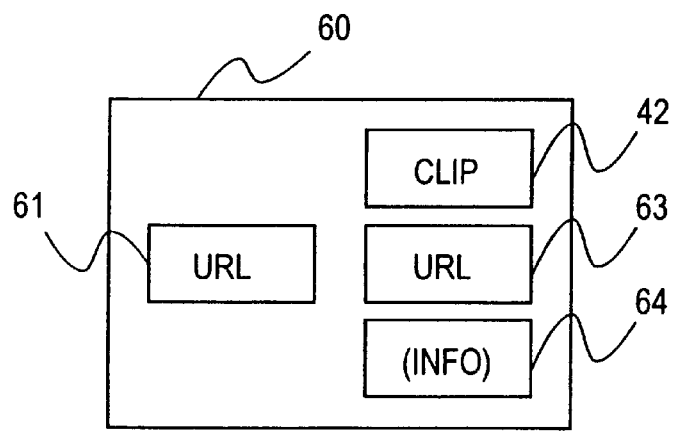
Figure 6:
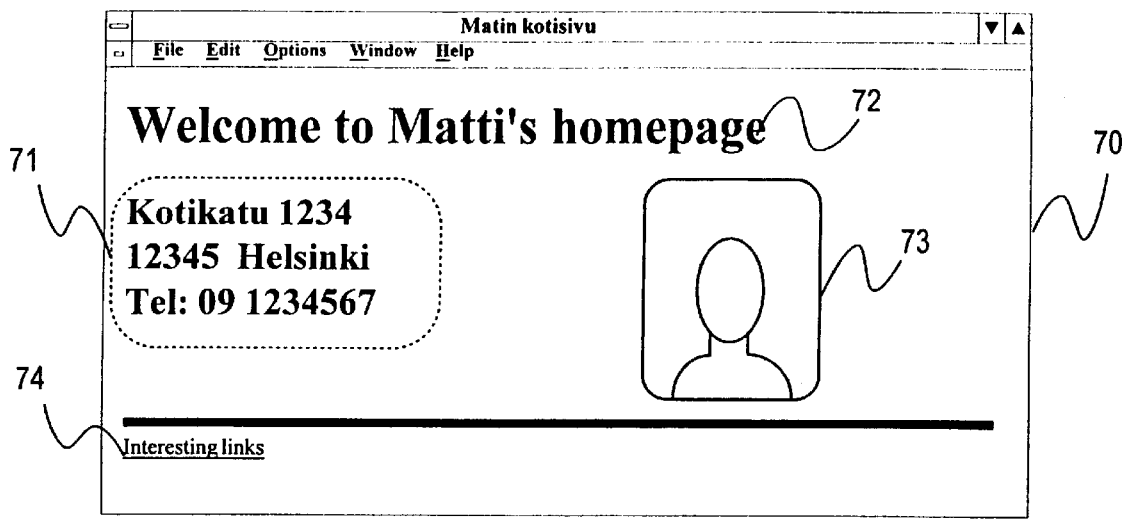
Figure 10:
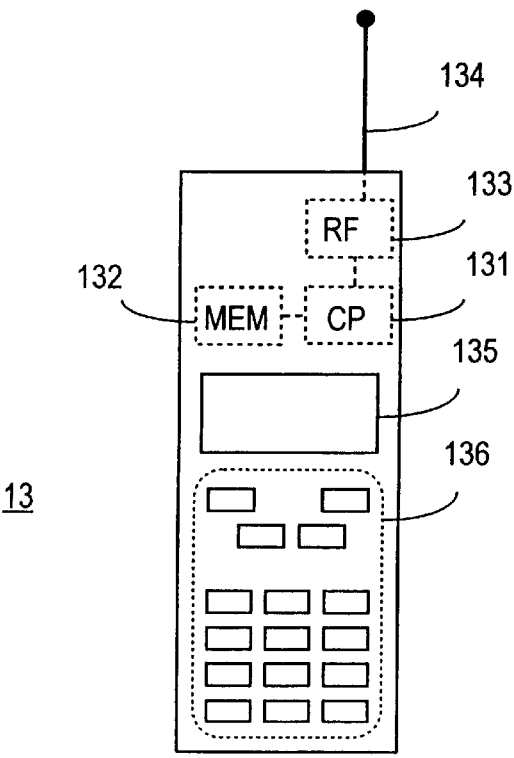
Figure 7:
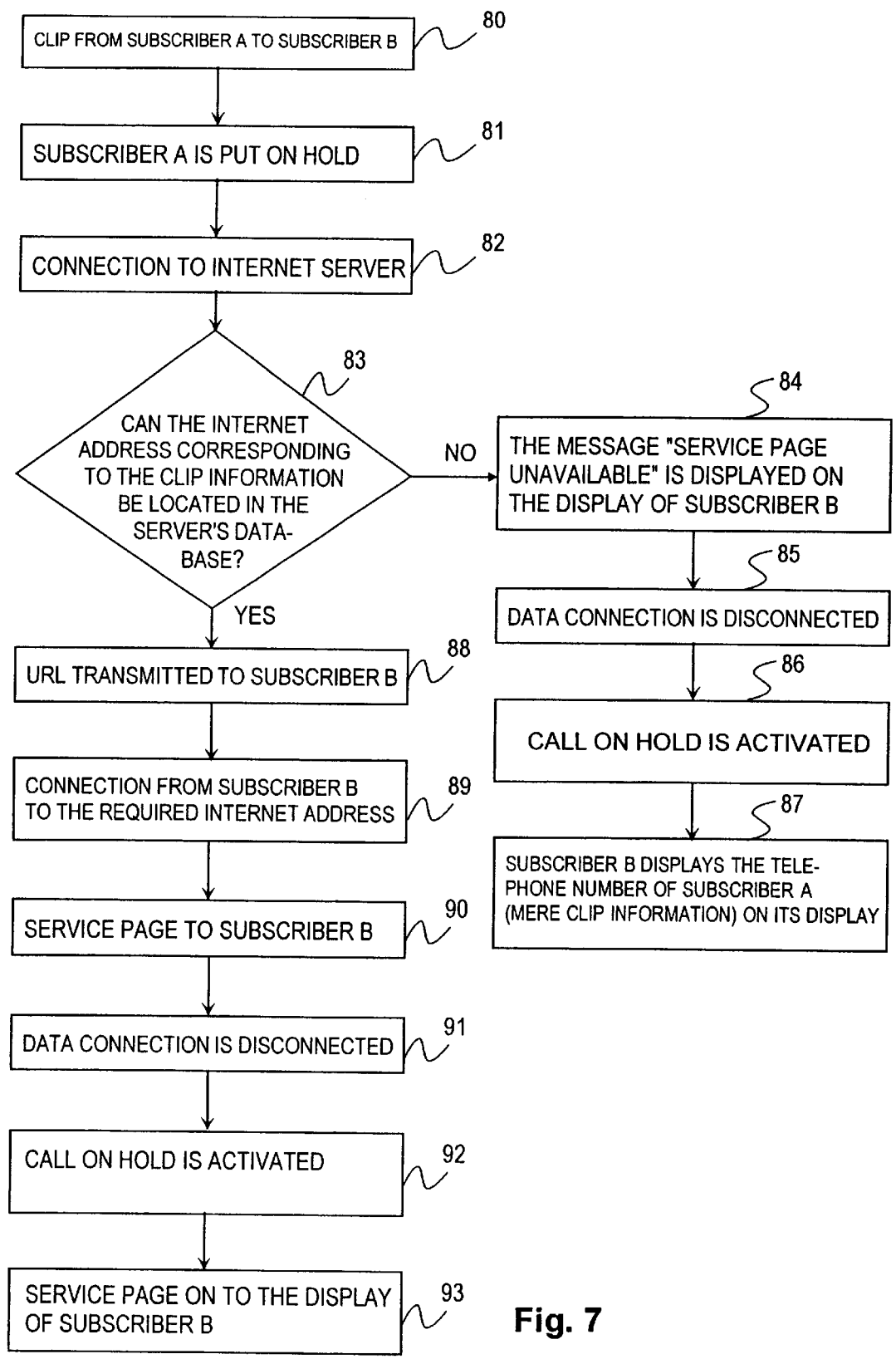
Figure 8:
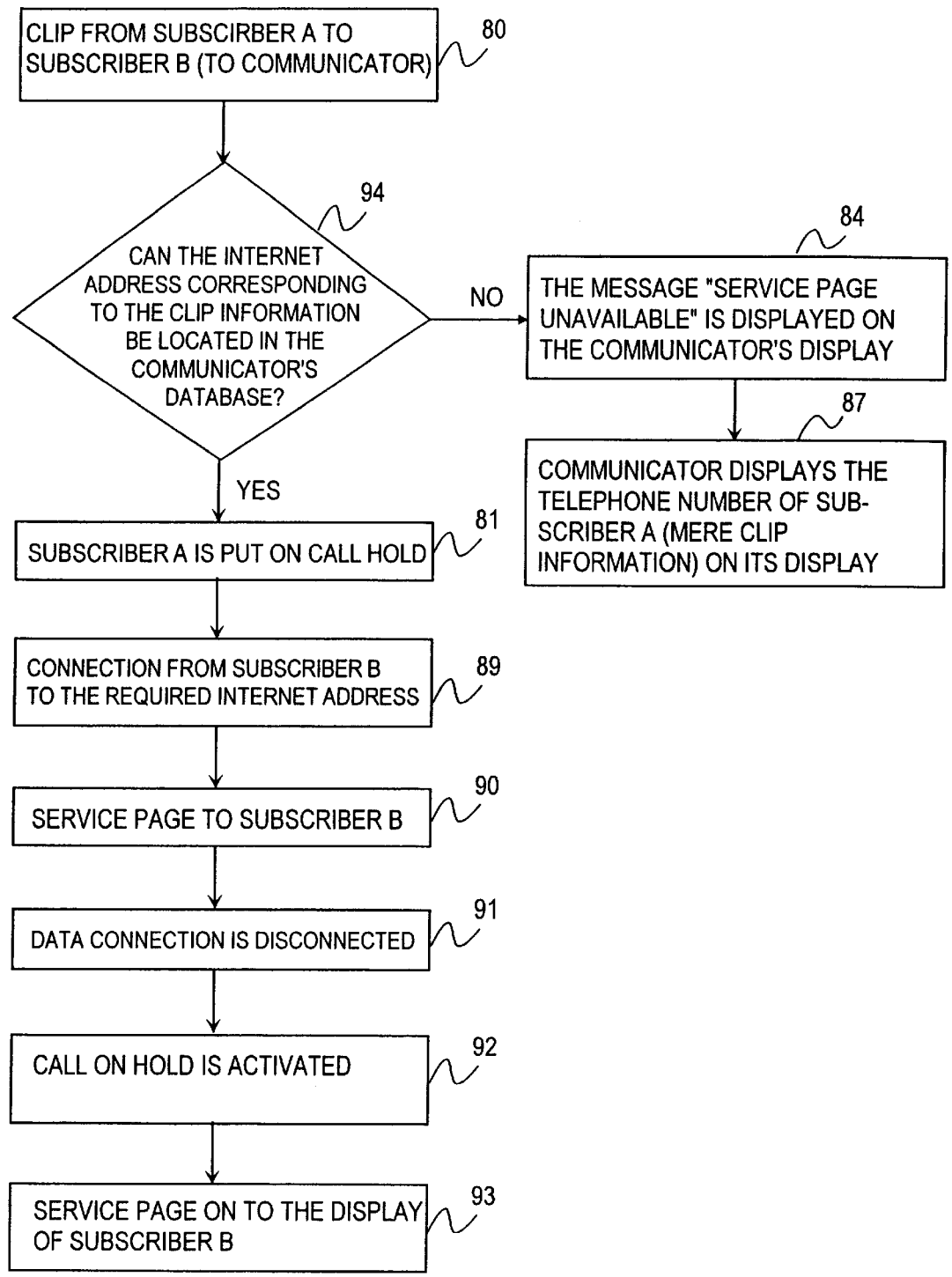
Figure 9:
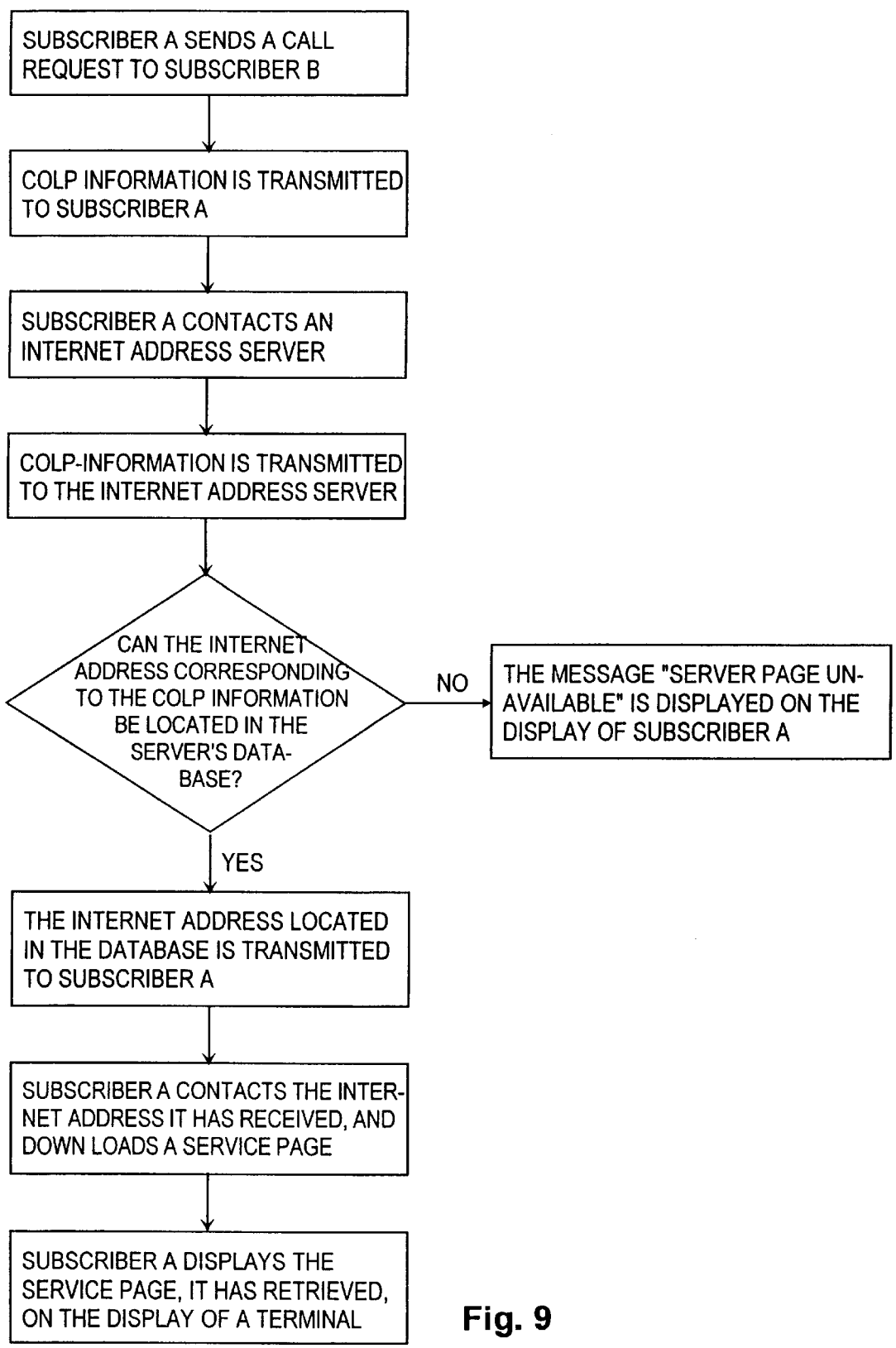

FIG. 1 illustrates an example of a telecommunication system according to the invention and its structural parts, FIG. 2 illustrates, as a flowchart, the transmission of a service page, according to the invention, in an embodiment of the invention, wherein a subscriber B selects the desired service page, FIG. 3 illustrates how address information and identification information are included in a data packet, FIG. 4 illustrates an implementation of the implementation of a reference table, characteristic of the invention, FIG. 5 illustrates a data packet used for transmitting information in connection with the invention, and the information it contains, FIG. 6 illustrates an example of a service page that can be transmitted in a manner according to the invention, FIGS. 7, 8 and 9 illustrate, as a block diagram, the transmission of a service page according to the invention in certain embodiments of the invention, and FIG. 10 illustrates a communicator according to the invention and its structural parts.

FIG. 1 illustrates an example of a telecommunication system according to the present invention, wherein it is possible to transmit service pages, created and maintained in a telecommunication network, on to the display of terminals. The system comprises different kinds of terminals, such as mobile stations 10 and 11 that can be coupled to computers 20 and 21, traditional mobile stations 12, communicators 13, wired telephones 14 that can be coupled to a computer 22, as well as ordinary telephones 15. In addition to these, an extremely suitable terminal is a computer which is equipped, e.g., with a radio module, connected to the computer's PCMCIA (Personal Computer Memory Card International Association) bus, the radio module providing for a wireless communication connection to be established in telecommunication networks. Area 18, indicated by a dashed line, illustrates a telecommunication system within an office. In addition to the mobile stations 10 and 11, coupled to the computers 20 and 21, it comprises a local area network (LAN, Reference 26), as well as a server 23. The local area network 26 has been coupled to public telecommunication networks, such as an Internet network 120 by means of a router 27. Public Internet servers 24 are connected to the Internet network 120. The Internet network 120 is in contact with a public telephone network (ISDN/PSTN, Reference 110) through a gateway server 25. From the gateway server 25, there is also a connection to a mobile services switching centre 100. Base station controllers 104 and base stations 105, known to a person skilled in the art, as well as other structural parts characteristic of a mobile network are in contact with the mobile services switching centre. In connection with the mobile services switching centre, there is also provided a separate database 101 for storing CLIP OR CoLP identifiers 53 and the corresponding URL addresses 54.

In the following, the transmission of a service page according to the present invention is described in detail with the help of a preferred example, wherein a receiving terminal retrieves through the Internet network, on the basis of the information transmitted by means of a CLIP service, additional information on a caller (subscriber A) and displays it on the display of a receiving terminal (subscriber B). If no additional information is available, the receiving terminal displays on its display the mere information transmitted by the CLIP service (i.e., the caller's telephone number) in a manner known to a person skilled in the art. In this example, the traditional mobile station 12 acts as the caller (subscriber A) and the telephone 14, which is in contact with the computer 22 and the telephone network 110, is the receiving terminal. FIG. 2 illustrates, in the form of a block diagram, the procedure that has been presented in detail both above and in the following chapter.

When a call is made from the mobile station 12 (subscriber A 12), through the base station 105, the base station controller 104, the mobile services switching centre 100 and the telephone network 110, to the subscriber number (Phase 30, FIG. 2) of the telephone 14 (subscriber B 14), the subscriber number (telephone number) of the mobile station 12 is transmitted as a CLIP service to the telephone 14 (Phase 31) in manner known to a person skilled in the art. If the telephone 14 is, e.g., an ISDN telephone equipped with a display, the telephone number of the mobile station 12 is normally displayed on a display 16 of the telephone 14. The communication system according to the invention preferably also provides an opportunity to present other information. In this embodiment of the invention, this is implemented so that the computer 22 has been coupled, by means of a cable 28, parallel to the telephone 14 and from the computer there is a connection to the Internet network 120. When the CLIP information arrives at the telephone 14, it is also simultaneously transmitted, through the cable 28, to the computer 22, e.g., through a commercially available ISDN card installed in the computer 22. The ISDN card, installed in the computer 22, identifies the subscriber identifier (telephone number) of the subscriber A 12 and stores it in its memory, whereto an application program, installed in the computer 22, can go and read it, e.g., through the computer's PCI (Peripheral Component Interconnect) or ISA (Industry Standard Architecture) bus. Alternatively, the ISDN card can transmit the subscriber identifier directly into the computer's memory through said buses and inform the application program by means of a message informing of the reception of the CLIP information. The application program can be implemented in a manner known to a person skilled in the art by utilising an application programming interface (API) supplied by the ISDN card manufacturer.

The implementation of the application program is dependent on the structure of the ISDN cards and on the implementation of the different kinds of application programming interfaces provided by the card manufacturers. After having received the CLIP identifier of the subscriber A 12, the computer 22 contacts, through the Internet network 120, a reference server (Phase 32), in this case, e.g., the address server 24, by transmitting it a contact message 40 (FIG. 3).

In the contact message 40 (FIG. 3), the computer 22 includes, in addition to a URL (Uniform Resource Locater) address 41 of the address:server 24, a CLIP identifier 42 of the subscriber A, which is thus transmitted to the address server 24 (Phase 33). The address server 24 comprises a reference database 50 (FIG. 4), wherein a number of Internet addresses (URL1-URLN, Reference 54) corresponding to the CLIP identifiers (CLIP1-CLIPN, Reference 53) of different subscribers have been stored. This reference database 50 can be maintained, e.g., by some commercial service provider in contact with the telecommunication network 120, but the reference database can also be integrated with the mobile services switching centre 100 and/or the database 101 arranged in connection with it. When the address server 24 receives the contact message 40 from the computer 22, it goes to its reference database 50 to see whether the CLIP identifier 53, corresponding to the CLIP identifier 42 of the subscriber A in question, can be located (Phase 34). If the corresponding CLIP identifier 53 cannot be located in the reference database 50, then neither has the corresponding URL address 54 been linked with the CLIP identifier 42 in question. In that case, the address server 24 transmits to the computer 22 a response message 60 (FIG. 5), wherein it informs that the URL address 54 corresponding to the CLIP identifier 42 cannot be located. The response message 60 comprises a URL address 61 of the computer 22 on the basis of which the response message 60 is routed to the computer 22, as well as the CLIP identifier 42 of the subscriber A, a URL data field 63 and an additional data field 64. The CLIP identifier 42 of the subscriber A is placed in the response message 60 so that the computer 22 is able to distinguish between the possibly many response messages 60, relating to different calls. A negative search result is indicated, e.g., so that the URL data field 63 of the response message 60 is left empty. If the URL address 54 corresponding to the CLIP identifier 42 of the subscriber A was not located, the computer 22 displays on its display, if so required, a text which informs that no URL address (i.e., an Internet address, wherefrom the service page could be retrieved) corresponding to the caller (subscriber A 12) can be located (Phase 35). If the telephone 14 is equipped with the sufficiently large display 16, it is possible to transmit the information directly on to the display 16 of the telephone 14. After the optional message mentioned above (Phase 35), the CLIP identifier (telephone number) of the subscriber A is displayed as normal on the display 16 of the telephone 14 (Phase 36).

If a CLIP1 identifier 51, corresponding to the caller's CLIP identifier 42, is located in the reference database 50, the address server 24 places a URL1 address 52 corresponding to it in the URL data field 63 of the response message 60. After this, the address server 24 sends the response message 60 to the computer 22 (Phase 37). After having received the response message 60, the computer 22 retrieves on the basis of the URL address 63, through the Internet network 120, a service page 70 corresponding to the URL address 63 (FIG. 6) from one of the servers 23, 24, 25 (Phase 38) connected to the network. The server can be the same as the reference server 24, but it can just as well be the subscriber A's own server located anywhere in the Internet network 120. The server 23, 24, 25 can also be a commercial service that can be purchased from teleoperators, whereupon the server is typically on the teleoperators' premises. After having retrieved the service page (e.g., the information page 70 implemented in the HTML page description language), the subscriber B 14 preferably displays it on the high-quality display of the computer 22 (Phase 39), but depending on the properties of the display 16 of the telephone 14, it can also be displayed on the display 16 instead of the telephone number (CLIP identifier 42). In this exemplary case, the service page 70 contains, among other things, address information 71 of the subscriber A 12, a greeting 72 and a picture 73 of the user of the telephone 12. In addition, the service page 70 may comprise, e.g., links 74 to other WWW pages, as well as audio and video shots. Since separate communication connections are used for switching the call and transmitting the service page 70 (telephone network 110 and Internet network 120), the transmission of the service page according to the present invention does not affect normal call set-up at all. The time consumed on transmitting the service page 70 from the server 23, 24, 25 that is in contact with the Internet network 120, depends only on the capacity of the Internet network 120 and different components 23, 24, 25, 26, 27 that are in contact with it.

The area 18, indicated by a dashed line in FIG. 1, illustrates a communication system used within an office. The local are network 26 is used as its internal communication bus. The architecture of this system differs from the one presented above in that the computers 20 and 21 are equipped with the specified mobile stations 10 and 11 to be connected to the computers. The mobile stations 10 and 11 are equipped with means which also enable calls to be transmitted through the Internet network 120. Thus, no separate direct connection to the telephone network 110 is preferably required. The usefulness of transmitting the service page 70 by means of the identification services (e.g., the CLIP and CoLP services) of a line according to the present invention is illustrated below by way of another example, wherein said office is assumed to be a teleselling office. A common database for all the telesellers comprising, among other things, the customers' contact information, volume of orders in hand, invoicing and information on previous contacts has been stored in the company's own server 23. Communication from the computers 20 and 21 to the server 23 is managed using Internet protocol and the local area network 26, but since external servers (e.g., the computer 22) have limited access to the database mentioned above, the system is called an Intranet network.

When the mobile station 10, 11 is coupled to the computer 20, 21, the computer 20, 21 identifies the mobile station 10, 11 coupled thereto, e.g., on the basis of a telephone number stored in a SIM (Subscriber Identity Module) card used in the mobile station. After this, the computer 20, 21 sends, through the local area network 26, the router 27 and the Internet network 120, the information about the coupling to the server 25. The server 25 maintains a database of those mobile stations which are connected to the computers 20 and 21 and sends the information further to the mobile services switching centre 100 or correspondingly to the telephone exchange 110, e.g., as a call transfer. Thus, the mobile services switching centre 100, the telephone exchange 110 and the server 25 can route the incoming calls through the Internet network 120 to the mobile stations 10, 11 coupled to the computers 20, 21. When the mobile station 10, 11 is connected to the computer 20, 21, the traditional radio frequency components of the mobile station 10, 11 can be switched off. The mobile station 10, 11 operates unconnected, i.e., when it has not been coupled to the terminal 20, 21, just as the ordinary mobile station 12.

When the subscriber A, e.g., the mobile station 12, contacts the subscriber B, i.e., the mobile station 10 in this teleselling example, the CLIP information is transmitted from the mobile station 12 to the mobile station 10 through the mobile services switching centre 100, the server 25, the Internet network 120, the router 27, the local area network 26 and the computer 20. When perceiving the CLIP information 42 transmitted to the mobile station 10, a program installed in the computer 20 establishes a connection, through the local area network 26, to the office's own server 23 and retrieves therefrom the service page corresponding to the subscriber A 12 (containing the subscriber A's address information etc. as presented above), provided that it can be located in the file. In this respect,the activity corresponds to the principle described in connection with the embodiment presented above. Thus, the information retrieval, procedure, implemented in this teleselling example on the basis of a CLIP identifier according to the present invention, provides for the customer data of a customer contacting by telephone to be updated on the screen of the computer 20 preferably without the user of the computer 20 being actively involved. The communication system according to the invention facilitates and speeds up the work of telesellers because, in the previous systems, it has been necessary to separately retrieve customer data from a database manually, e.g., on the basis of the caller's name.

In the two exemplary cases, presented above in detail, a wired communication connection was used to retrieve a service page from the Internet network 120 or from an intranet network (local area network 26). Advanced telecommunication terminals also provide an opportunity to utilise wirelessly the transmission of the service page 70, according to the present invention, on the basis of a CLIP or CoLP identifier. In the following, the present invention will be illustrated by way of example, wherein a telephone 15 is the subscriber A and the communicator 13 is the subscriber B. When a connection is established from the telephone 15 to the communicator 13 through the telephone network 110, the mobile services switching centre 100, the base station controller 104 and the base station 105, the CLIP identifier of the telephone 15 is transmitted to the communicator 13 in a known manner. On the basis of this information, the communicator 13 according to the present invention opens up a data connection through the mobile network 105, 104, 100 and the server 25 to the Internet network 120 and further, e.g., to the server 24, wherefrom it retrieves the service page addressed to the subscriber A (telephone 15) provided that it exists. In principle, the procedure is the same as in the two previous embodiments of the invention presented above. The structural parts of the communicator 13 according to the invention, i.e., a processor 131, a memory 132, radio parts 133, an antenna 134, a small display 135 and a keyboard 136 have been illustrated folded in FIG. 10. The service page retrieval process is preferably implemented programmably in the processor 131 and the program code itself has been stored in the memory 132.

However, when using the wireless communication connection, presented in the previous chapter, we face a problem in the current mobile communication systems. In the GSM system, for example, there is only one traffic channel for transmitting speech and data. This prevents speech and data from being transmitted simultaneously from two different addresses 15, 24. The reason for this is that the call set up by the subscriber A 15 to the subscriber B 13 requires a traffic channel of its own in the same way as the data connection used for transmitting the service page 70 from the server 24 to the subscriber B 13.

What has been presented above will no longer be a problem in future mobile networks, which will provide for several different types of data to be transmitted simultaneously. An example of this is the GPRS (General Packet Radio Service), to be implemented on the GSM system, which provides a data transmission channel in the form of a packet that can be used at the same time as the normal traffic channel used for speech transmission. Thus, the service page transmission system according to the present invention is extremely suitable for use in connection with GPRS-type mobile networks, wherein normal speech communication is established using a normal GSM traffic channel and the service page is retrieved from the Internet network 120 using a GPRS data channel.

Alternatively, the problem presented above can be solved using a short message service (SMS), provided by the GSM system, for transmitting the service page 70. The short message service is a data channel originally designed for transmitting short messages consisting of a maximum of 160 ASCII characters, although the short message service is expected to be expanded. The expansion of the short message service will also provide for messages consisting of more than 160 characters to be transmitted by dividing the transferable data into several successive short messages. The short messages are transmitted in a signaling channel and, therefore, the use of the short message service does not restrict the use of the traffic channel for simultaneous speech communication.

It is also possible to implement the system for transmitting the service pages 70, according to the present invention, in the existing GSM networks without short messages by using supplementary services (SS) and unstructured supplementary service data (USSD), provided by the GSM system.

In addition to the CLIP and CoLP services mentioned above these include, among other things, putting an answered call on hold and setting up a second connection. A prerequisite for the use of the supplementary services is that the terminal has certain intelligence, but preferably no changes have to made in the mobile network 100, 104, 105. In the following, an embodiment of the present invention is presented in detail by referring to FIG. 7. In this embodiment, the communicator 13 retrieves the service page 70 wirelessly utilizing the supplementary services of a GSM network.

In FIG. 7, the operation of the embodiment of the invention, mentioned above, has been illustrated in the form of a flowchart. First, the subscriber A (telephone 15) calls the subscriber B, through the telephone network 110, the mobile services switching centre 100, the base station controller 104 and the base station 105, and the CLIP identifier 42 is transmitted to the subscriber B, i.e., to the communicator 13 (Phase 80). After having received the CLIP identifier, the communicator can retrieve the service page 70 in a number of ways. The CLIP service of the GSM system enables the subscriber A to be identified without the call being answered. Thus, it could be possible for the processor 131 of the communicator 13 to initiate the process of retrieving the service page 70 without answering the call coming from the subscriber A. However, because it is impossible to know the exact time consumed on the transmission of the service page 70, retrieved through the Internet network 120, it is better to answer the call and ask, e.g., by means of a message stored in the memory 132 of the communicator 13, the subscriber A 15 to hold on a moment without disconnecting the telephone 15. Naturally, this information could be transmitted orally, but one advantage of the invention is just the fact that the service page 70 can be transmitted automatically without the subscriber B being actively involved. In the embodiment illustrated in FIG. 7, it is assumed that the communicator 13 answers the call automatically, transmits to the subscriber A the message telling to wait, stored in advance in the memory 131, and, after this, sets the call coming from the subscriber 15 on hold (Phase 81). Next, the communicator 13 sets up, through the radio parts 133 and the antenna 134, a data call to the server 24, which is in contact with the Internet network 120, through the mobile network 100, 104, 105 and the server 25 (Phase 82). After this, the server 24 goes through its reference table 50 to see whether the URL address 52, corresponding to the CLIP information 42 of the subscriber A, can be located (Phase 83). If a corresponding URL address cannot be located, the server 24 transmits to the communicator 13 the response message 60 informing of the negative search result. In that case, if so required, the communicator 13 displays on its display 17, e.g., a message "Service Page Unavailable", to the user (Phase 84). In the next phase, the communicator 13 disconnects the data call it has set up (Phase 85) and returns the call coming from the subscriber A 15 that has been put on hold, to an active state (Phase 87). But if the server 24 locates, in its reference database 50, the URL address 52 corresponding to the CLIP information 42 of the subscriber A 15, the server 24 transmits the URL address 52 to the communicator 13 included in the response message 60 informing of the positive search result (Phase 88). On the basis of the URL address 52 it has received, the communicator 13 makes contact, through the open data channel, with the server indicating the URL address 52 (e.g., the server 25 maintained by an operator) (Phase 89) and asks it to transmit the service page 70 corresponding to the subscriber A 15 (Phase 90). When the service page 70 has been received in full, the communicator 13 disconnects the data connection controlled by the processor 131 (Phase 91) and returns the call on hold to an active state (Phase 92). The service page 70, corresponding to the subscriber A, that has been retrieved through the Internet network 120 is displayed on the display 17 of the communicator 13 according to the present invention (Phase 93) instead of a mere telephone number provided by the CLIP service.

If the reference table 50 is located in the memory 132 of the communicator 13, instead of being in a telecommunication network server (such as the server 24 mentioned in the specification of FIG. 7), the process presented above is simpler. The reason for this is that it is not necessary to first contact telecommunication network servers in order to find out the URL address of the service page 70 (Phase 82, FIG. 7), but the possible URL address can be located directly in the memory 132 of the communicator 13. Thus, it is neither necessary to perform the activities illustrated in the phases 85, 86 and 88 of FIG. 7, because the subscriber A is put on hold (FIG. 8, Phase 81) only after the URL address has been retrieved from the memory 132 (Phase 94). FIG. 8 illustrates this particular embodiment of the present invention. The phases 80, 81, 84, 87, 89, 90, 91, 92 and 93, common to FIGS. 7 and 8, have been illustrated using the same numbers. It is also possible to equip the memory 132 of the communicator 13 with a combination software enabling the service page 70 to be utilised irrespective of whether the reference table 50 is located in a telecommunication network server or in the actual terminal (communicator 13).

In the examples of the embodiments presented above, the service page 70 was always transmitted from a server chosen by the receiver (subscriber B). It is true that this is a natural course of action according to the nature of the transmission mechanism of CLIP information and that of call traffic, since it is always the receiver who also makes the final decision of whether he answers the incoming call at all. However, it is also possible to transmit the service page 70 on the basis of the CLIP information, according to the present invention, controlled by the subscriber A provided that the subscriber B allows this with his terminal. The practical implementation corresponds to what has been presented in connection with the specification of FIGS. 2–8 with the exception that the subscriber A has been provided with an opportunity to edit the reference database 50 (FIG. 4). Thus, the subscriber A can specify the URL address 52 corresponding to this own CLIP identifier (e.g., CLIP1, Reference 51). Hence, when the subscriber A establishes a connection to the.subscriber B, the service page selected by the subscriber A, e.g., a service price-list or some other commercial handout, is transmitted to the subscriber B.

The procedure presented above can also be utilised in connection with automatic telecommunication services. In the following, we will describe, as an exemplary embodiment, the transmission of tips for the pools and the results of ice-hockey matches from the server 25 (subscriber A) to the portable communicator 13 (subscriber B). The service page comprising the tips for the pools and the results of the matches has been implemented, e.g., in the HTML page description language as the service page 70 illustrated in FIG. 6. In this example, the user of the communicator 13 has made a contract with a public telecommunications operator for the transmission of the tips for the pools and the results of the ice-hockey matches every time the data are updated. This has been implemented so that when the data of the service page change, the server 25 contacts the communicator 13 through the mobile network 100, 104, 105. The communicator 13 identifies, on the basis of the CLIP identifier it receives, that the teleservice presented above is being transmitted. The communicator 13 according to the present invention transmits to the user, controlled by the processor 131, a specific ringing tone to inform that the service has been activated and to distinguish the service from an ordinary incoming call. The program code, stored in the memory 132 of the communicator 13, can be set on automatic response, whereupon it is possible to utilize the service completely without the user being actively involved. After this, the communicator 13 retrieves, e.g., from the URL address, agreed upon when making the service contract and stored in the memory 132 of the communicator 13, the service page comprising the tips for the pools and the results of the matches by means of the service page transmission method according to the present invention and displays it on its display 17 (folded with the small display 135). Thus, the user of the communicator 13 always receives automatically the results of the matches in real time. A similar type of service is also suitable for advertising purposes. In that case, a service provider can transmit, e.g., a price list that is changed monthly to all prospective customers using a terminal capable of transmitting service pages on the basis of a CLIP identifier according to the present invention.

In the detailed specification of the present invention, we have described many different types of services that provide for the versatile service pages 70 to be transmitted to the subscriber B on the basis of the information transmitted by the CLIP service. By means of the service page transmission method according to the present invention, it is also possible to transmit the service pages 70 to the subscriber A on the basis of the CoLP service of the GSM system as already stated in the short summary of the invention. In this case, the implementation of the invention substantially complies with the solutions presented in connection with FIGS. 2–8. FIG. 9 illustrates, in the form of a flowchart, the transmission of a service page, linked with the subscriber B, to the subscriber A on the basis of the CoLP information. The flowchart, illustrated in FIG. 9, can be applied to the third and fourth embodiments of the present invention presented in the short summary of the invention.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. An information transmission system comprising: a first terminal, a second terminal and means for setting up a communication connection between said first terminal and said second terminal and that said communication connection set-up means have been arranged to transmit a first telephone network subscriber identifier identifying a calling line, characteristic of said first terminal, to said second terminal, wherein, said communication connection set-up means have been arranged to transmit, in addition, a second telephone network subscriber identifier identifying a connected line, characteristic of said second terminal, to said first terminal; and said information transmission system further comprises a server connected to said communication connection, said server capable of to store and further transmit service pages to said first terminal and to said second terminal; and that said communication connection set-up means have been arranged to substantially simultaneously transmit a specified service page to
    said first terminal on the basis of said second telephone network subscriber identifier and to said second terminal on the basis of said first telephone network subscriber identifier.

2. An information transmission system according to claim 1, wherein said first telephone network subscriber identifier comprises CLIP (Calling Line Identification Presentation) information and said second telephone network subscriber identifier comprises COLP (Connected Line Identification Presentation) information.

3. An information transmission system according to claim 1, wherein, in addition, it comprises a reference database for storing the telephone network subscriber identifier, characteristic of said first terminal, and the telephone network subscriber identifier, characteristic of said second terminal, and address information of said server and that said reference database is located in one of the following parts of the information transmission system: said first terminal and said server.

4. An information transmission system according to claim 3, wherein, in addition, it comprises a mobile services switching centre and storage means and that said reference database is located in said storage means.

5. An information transmission system according to claim 3, wherein said communication connection set-up means have been arranged to transmit said service page from an address specified by said address information stored in said reference database.

6. An information transmission system according to claim 4, wherein it comprises means for editing said reference database and for rendering the editing rights and that one of the following has been arranged to edit said reference database: said first terminal, said second terminal and said server.

7. A method for transmitting information, comprising the steps of:
    setting up a communication connection between a first terminal and a second terminal,
    transmitting a first telephone network subscriber identifier, identifying a calling line, characteristic of said first terminal, to said second terminal,
    transmitting a second telephone network subscriber identifier, identifying a connected line characteristic of said second terminal, to said first terminal,
    substantially simultaneously transmitting a specified service page to:
        said first terminal on the basis of said second telephone network subscriber identifier and to said second terminal on the basis of said first telephone network subscriber identifier.

8. A method for transmitting information according to claim 7, wherein said first telephone network subscriber identifier comprises CLIP (Calling Line Identification Presentation) information and said second telephone network subscriber identifier comprises COLP (Connected Line Identification Presentation) information.

9. A method for transmitting information according to claim 7, wherein said service page is transmitted on the basis of telephone network subscriber identifiers and address data stored in a separate reference database.

10. An information transmission system comprising:
    a first terminal, a second terminal and means for setting up a communication connection between said first terminal and said second terminal and that said communication connection set-up means have been arranged to transmit a first telephone network subscriber identifier as a Calling Line Identification Presentation (CLIP), characteristic of said first terminal, to said second terminal, wherein, said communication connection set-up means have been arranged to transmit in addition, a second telephone network subscriber identifier as a Connected Line Identification Presentation (COLP), characteristic of said second terminal, to said first terminal;

a first server connected to said first terminal by an independent communication connection for storing and transmitting service pages to said first terminal;

a second server connected to said second terminal by an independent communication connection for storing and transmitting services pages to said second terminal;

wherein said service pages are substantially simultaneously transmitted to said first terminal on the basis of said COLP identifier and to said second terminal on the basis of said CLIP identifier.

11. An information transmission system according to claim 10, wherein, said first server includes a reference database for storing the COLP identifier correlated to a related service page, of said second terminal, and said second server includes a reference database for storing the CLIP identifier correlated to a related service page, of said first terminal.

12. An information transmission system according to claim 10, further comprising a mobile services switching center having storage means and that at least one of said reference databases is located in said storage means.

13. An information transmission system according to claim 10, further means for editing said reference databases by operation of said first terminal, said second terminal or both.

14. A method for transmitting information, comprising the steps of:

setting up a communication connection between a first terminal and a second terminal, transmitting a first telephone network subscriber identifier as a Calling Line Identification Presentation (CLIP), characteristic of said first terminal;

transmitting a second telephone network subscriber identifier as a Connected Line Identification Presentation (COLP), characteristic of said second terminal;

storing and transmitting a service page on a first server connected to said first terminal by an independent communication connection;

storing and transmitting a service page on a second server connected to said second terminal by an independent communication connection;

wherein said service pages are transmitted to said first terminal on the basis of said COLP identifier; and wherein said service pages are transmitted to said second terminal on the basis of said CLIP identifier.

* * * * *